April 9, 1935.  W. D. FOSTER ET AL  1,996,759
FILM HANDLING APPARATUS
Filed March 9, 1929   3 Sheets-Sheet 1
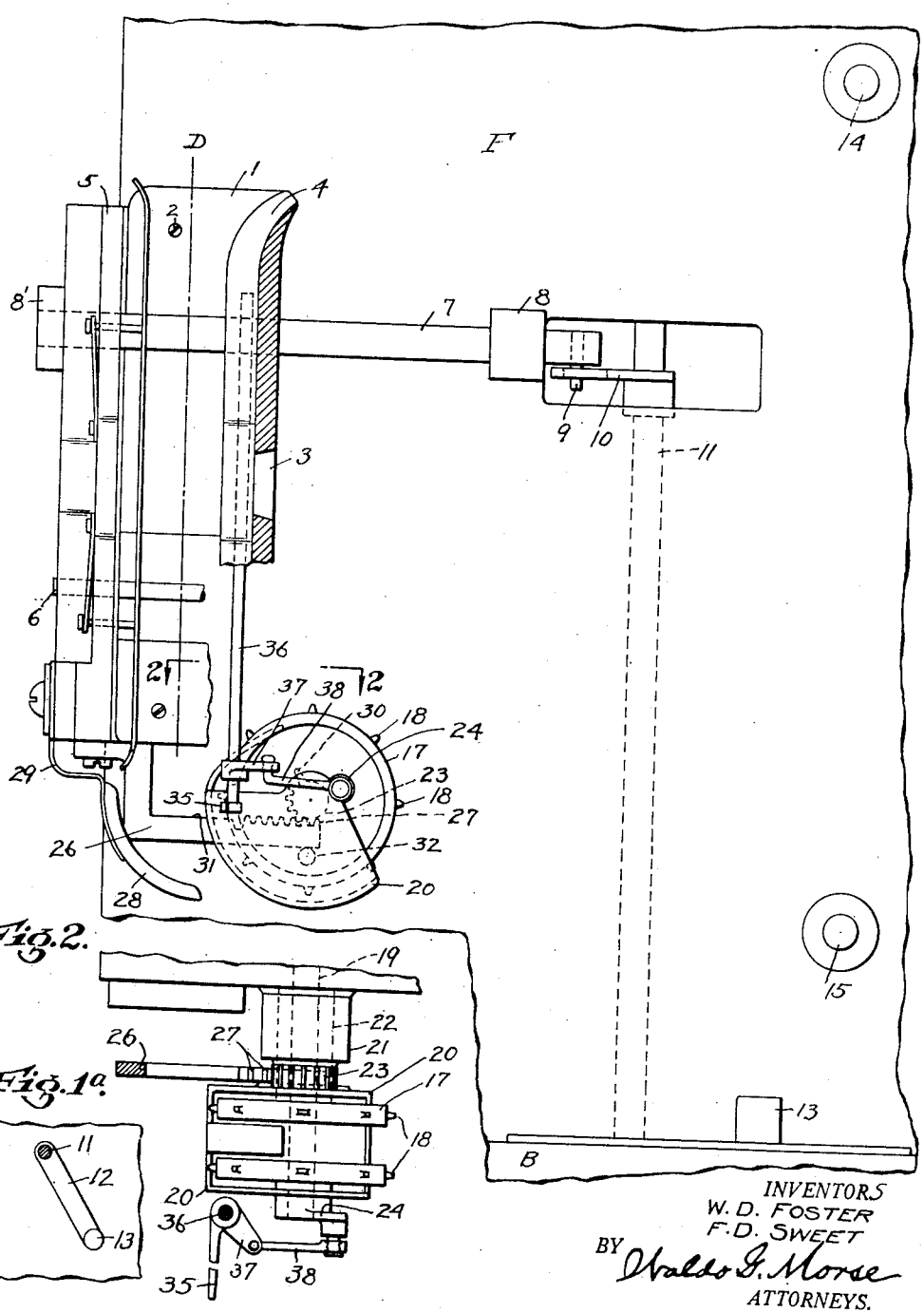
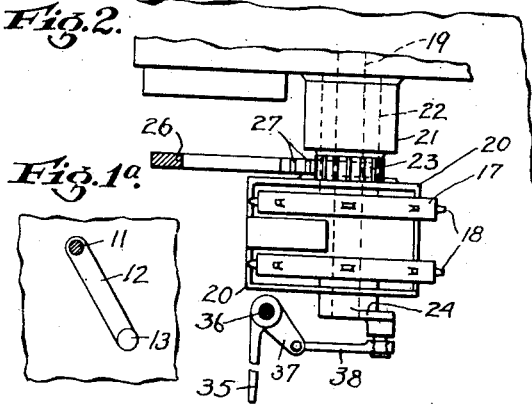
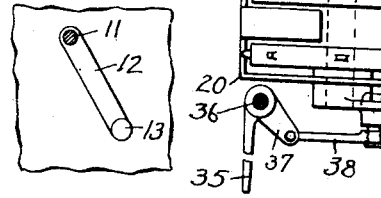
INVENTORS
W. D. FOSTER
F. D. SWEET
BY Waldo G. Morse
ATTORNEYS.

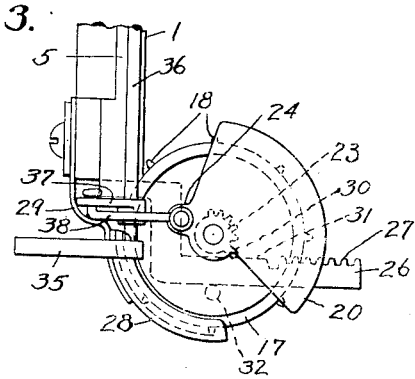
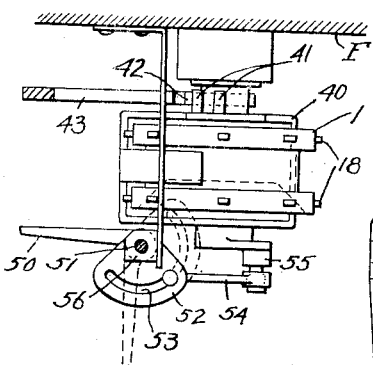
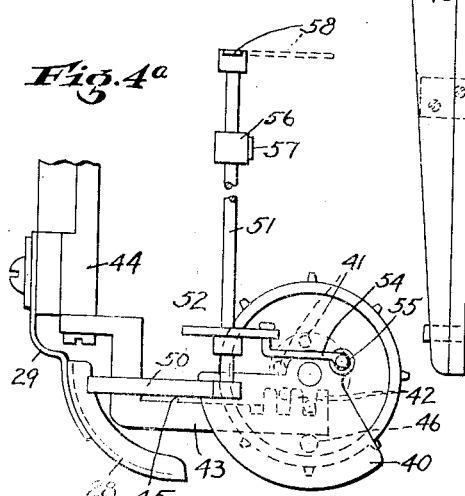
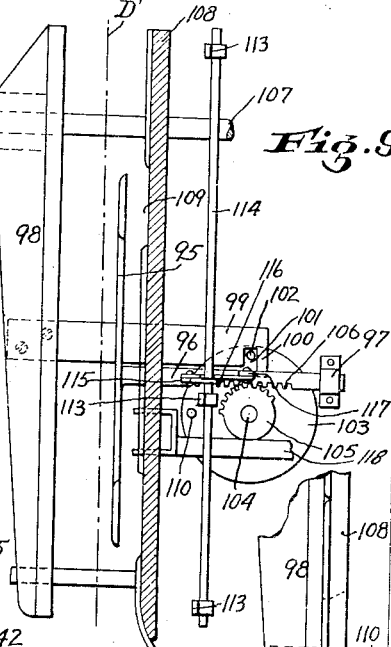
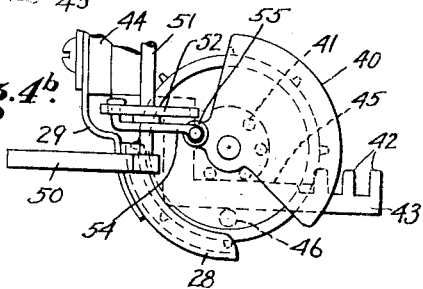
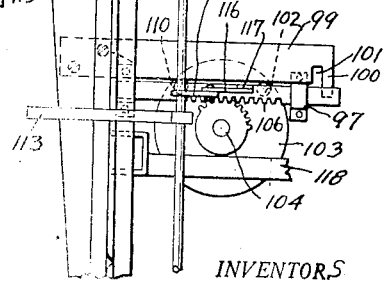

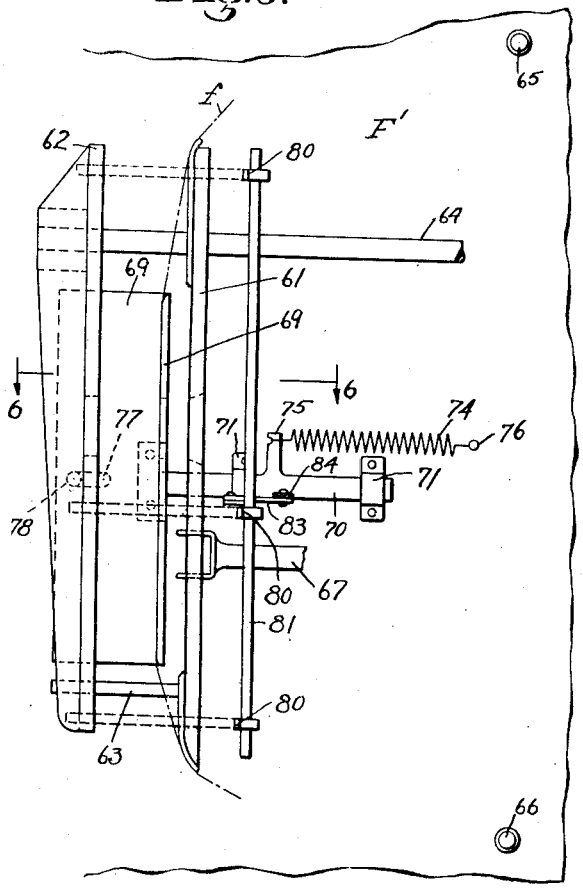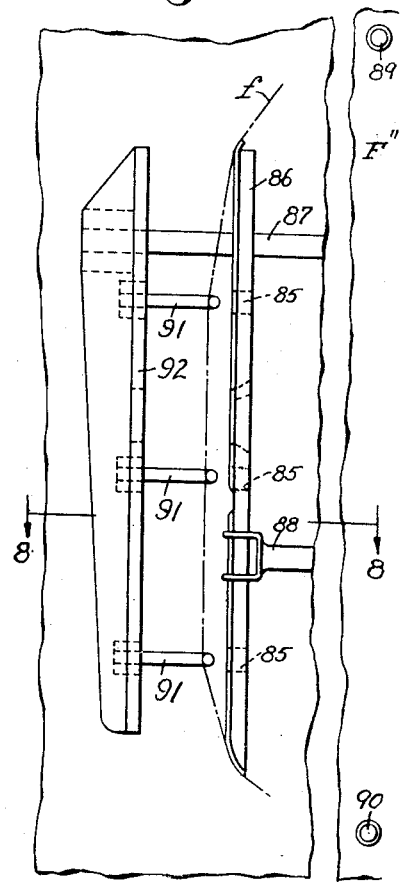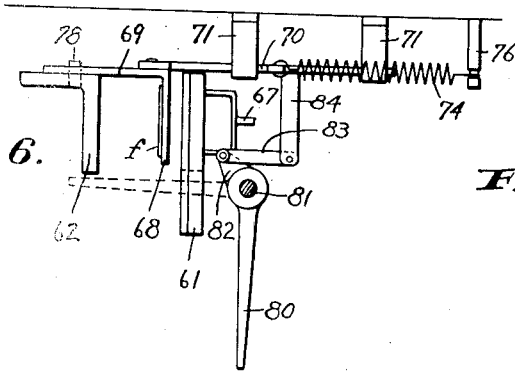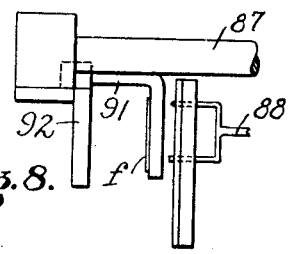

Patented Apr. 9, 1935

1,996,759

UNITED STATES PATENT OFFICE 1,996,759

FILM HANDLING APPARATUS

Warren Dunham Foster, Washington Township, Bergen County, N. J., and Frederick Davenport Sweet, New York, N. Y., assignors, by direct and mesne assignments, to Kinatome Patents Corporation, New York, N. Y., a corporation of New York Application March 9, 1929, Serial No. 345,716

48 Claims. (Cl. 88—17)

The present invention relates broadly to any art in which a film or other material of similar characteristics is fed, whether in apparatus adapted for the taking or projection of pictures, or in apparatus for the recordation or reproduction of sound, either alone or in conjunction with images of things, or in apparatus of other types.

An object of the present invention is the provision of an improved mechanism for the bodily removal of a film from a feeding member, an improved mechanism for bodily positioning the film in operative relation to such feeding member, or to the gate of the film handling apparatus, or to both of the same.

Another object of the present invention is the provision of an improved and simplified means for the operation of such mechanisms, in which such operation is preferably accomplished by the movement of one section of the gate, preferably by a direct connection between such mechanism and such movable section. A further object of the invention is the provision of operating means for either or both of such mechanisms whereby operation thereof in the desired timed or sequential relation to the movement of a section of the gate is secured, with the interposition of the desired period of dwell.

A further object of our invention is the provision of means whereby the film positioning mechanism may be operated by the film removing mechanism through a direct connection therebetween, thereby materially simplifying the construction of the apparatus.

It has been proposed to operate means for bodily removing the film and to move the movable section of the gate by the use of a common control means, the closing of the gate and the movement of the film removing means from operative position taking place substantially simultaneously. As a result, a construction has been required which demands careful fitting and assembly and is relatively expensive. In such a structure, unless the shoe which places the film into operative engagement with the film feeding member, such shoe being operated by the closing of the gate, and the element which removes the film from the feeding member, are accurately made and fitted various difficulties have resulted because of the necessarily close clearance between the moving parts and between such parts and the film and because of other factors. Such difficulties are avoided in apparatus constructed according to our invention, since the film removing element is completely retracted from operative position preferably before the shoe and movable section of the gate have completed more than half of their travel toward the feeding member. Similarly, when the gate is opened, the film removing element remains motionless until the shoe and the movable section of the gate have completely cleared its area of operation.

In such apparatus as has been proposed previously, the means for removing the film from the feeding member has been actuated by a necessarily complicated and expensive connection with the main control mechanism of the apparatus. In the present invention, the film removing member is actuated by an inexpensive link, directly attached to the movable section of the gate, thereby avoiding much expense of construction and difficulty of assembly and adjustment.

It also has been proposed to actuate the film removing member by means of spring pressure which becomes effective following the movement of the movable section of the gate away from the fixed section. The present invention has for one of its objects the provision of positive and direct connection between the film removing member and the movable section of the gate.

In apparatus constructed according to the present invention, the film removing member is preferably so designed as to protect the film from the teeth of the film feeding member after it has been operated to remove the film from such feeding member.

In a modified form of the present invention, the film removing element consists of a plurality of hooks attached to the movable section and operating through appropriate openings in the fixed section. The provision of a plurality of hooks is effective for protecting the film from the teeth of the feeding member as well as removing it therefrom.

Other objects of our invention include the provision of simplified and inexpensive operating mechanism for the film removing and protecting members and for the film positioning and locking members, and the provision of means, preferably positively operated, whereby the operation of such members and of the movable section of the gate may be timed as desired.

Other objects, advantages and characteristics are apparent in the following description, the attached drawings and the subjoined claims. Although we are showing several preferred embodiments of our invention, it will be readily understood that we are not limited to any particular construction as changes can readily be made without departing from the spirit of our invention or the scope of our broader claims.

In the drawings:

Figure 1 is a right side elevation of the gate, shoe, film removing mechanism and film positioning mechanism, the gate being open;

Figure 1a is a view of a portion of a control mechanism adapted to operate the gate;

Figure 2 is a view taken on the line 2—2 of Figure 1 looking in the direction of the arrows;

Figure 3 is a partial view showing the gate in closed position, the film removing member retracted from operative position, and the positioning fingers in the locking position;

Figure 4 is a view, corresponding to that shown in Figure 2, of a preferred modification of our invention in which the positioning and locking fingers remain in locking position after they have been set therein until they are manually removed therefrom;

Figure 4a is an elevational view of the modified structure shown in Figure 4 showing the film removing member in protective position, the gate open, and the positioning and locking fingers in operative position;

Figure 4b is an elevational view of the same, showing the film removing and protecting member moved to inoperative position, the positioning and locking fingers in operative position, and the gate closed;

Figure 5 is an elevational view of a preferred modification of our invention particularly suited to apparatus in which the feeding element is of the intermittent grip type;

Figure 6 is a view taken on the line 6—6 of Figure 5 looking in the direction of the arrows;

Figure 7 is an elevational view of another preferred modification of our invention, no period of dwell being provided between the operation of the parts of our invention;

Figure 8 is a view taken on the line 8—8 of Figure 7;

Figure 9 is an elevational view of a preferred modification of the form of our invention shown in Figure 5;

Figure 10 is a similar view showing the film removing and protecting member in inoperative position, the positioning and locking fingers in operative position, and the gate closed.

In carrying out our invention, there is preferably mounted on the front side of the frame F a fixed gate section 1 secured in any desired manner as by screws 2 against movement relatively to the frame. This section is preferably formed with an aperture 3, through which light may be passed as is well understood in the art, and with a film guiding depression 4 extending lengthwise of the section, and intersecting the opening 3, for the travel of the film. Cooperating with the section 1 is a relatively movable section 5 preferably guided by a pin 6 projecting outwardly from the section 1, and, by means of the boss 8', secured to one end of a gate opening rod 7 slidable through a suitable opening in the gate section 1 and a suitable bearing 8 on the frame F. By reason of this construction, it will be apparent that when the rod 7 is moved to the right as viewed in Figure 1, it will be effective for moving the section 5 toward the section 1 and into cooperative relation therewith, while movement in the opposite direction will move the section 5 away from section 1 to permit the removal of a film and the insertion of another film.

In order to move such rod 7, a pin 9 may be affixed to the right hand end thereof, as viewed in Figure 1, and cooperate with an appropriate slot in the link 10 which is attached to the gate control shaft 11, which may be suitably mounted upon the rearward side of the frame F. As will be apparent by reference to Figure 1a, such shaft may be rotated through the medium of the link 12 attached to the lower end thereof and the button 13 which may project above the base B of the apparatus.

The film may be supported in any desired manner as upon the spindles 14 and 15 which are permanently fixed for rotation in the frame F.

For effecting the desired intermittent feeding motion of a film through the gate, there may be provided a feeding sprocket 17 having film engaging teeth 18 adapted to engage apertures in the film. Such sprocket is mounted upon a shaft 19 extending transversely through the frame F and intermittently driven in any suitable manner.

Between the film support 14 and 15 and the sprocket 17 any desired means may be introduced for compensating for the differences in character of movement of such spindles and such sprocket. It will be readily understood that our invention may be equally well applied in connection with a continuously operated sprocket.

Cooperating with the sprocket 17 and normally occupying the position shown in Figures 1 and 2 is a film removing and protecting member 20. To the inner side thereof there is attached the collar 21 which is supported on the outside of the bearing 22 for the sprocket shaft 19. Upon the outer portion of such collar there is formed the pinion 23 for engagement with the mutilated rack later described. To the outer end of the member 20 there is attached a substantially right angled link 24 which operates the positioning finger rod later described. Such shield, collar, and link may be constructed in any desired manner; for instance, the shield and link may be stampings, and the collar a screw machine part, the three parts being attached by a driven fit. By reason of this construction, it will be evident that the film removing member and its associated parts are supported by the relatively large collar 21 upon the relatively long bearing 22, the contact between the outer portion of the sprocket shaft 19 and the film removing member being very light.

As is clearly shown in Figures 1 and 2, movement is imparted to the film removing member 20 by the mutilated rack 26, the left hand end of such rack, as viewed in such figures, being attached to the movable section 5 of the gate and the right hand end terminating in the teeth 27. It will be evident that when in the manner previously described the movable gate section 5 is moved to the right as viewed in Figures 1 and 2, the shield 20 will be quickly rotated to the inoperative position as shown in Figure 3, such rotative movement being completed when the movement of the gate section 5 has been sufficient to bring such section to a partially closed position such as, for example, that shown by the dot and dash line D in Figure 1. It will also be evident that the film removing member will have been completely retracted and the teeth of the sprocket exposed so that the shoe 28, carried as upon the spring member 29 at the bottom of the movable section 5, may position the film upon the sprocket, without danger of interference between the film and the film removal member or between the shoe and such member. As the movable section 5 moves to the right from line D, the elongated tooth 30 of the pinion 23 will slide along the flat 31 of the rack bar 26 whereby the film removing member 20 will be and remain locked in inoperative position. The right hand portion of the rack 26, as viewed in the drawings, may be held against downward movement by the pin 32.

Movement of the gate section 1 to the line D will likewise be without effect upon the film removing member 20, and movement from the line D to the completely open position shown in Figure 1 will be effective completely to rotate the member 20 into film removing position. It will be evident that when such shield is in the position shown in Figure 1 it is effective for protecting the film from the teeth of the sprocket.

In order to move the film completely within the area of the gate and in proper lateral relation to the film moving member 17 prior to the closing of the gate section 5, positioning fingers 35 may be provided, mounted as upon the rod 36 which is suitably journaled in the fixed gate section 1. To rotate such fingers in timed relation to the movement of the film removing and protecting member 20 and to the closing of the gate, an arm 37 is attached to such rod 36, such arm being connected to the collar 24 by means of the link 38. In order to accommodate the arcuate movement of the lever 37, the connection between the link 38 and the collar 24 may be relatively loose and the opening in the link 38 suitably relieved. By reason of this construction, it will be evident that when the film removing and shielding members 20 are moved to the right as viewed in Figure 1, they are immediately effective to rotate the rod 36 and the fingers 35 to the left as viewed in Figure 2 from the position shown therein and in Figure 1 to the position shown in Figure 3, thus completely positioning between the gate sections and relatively to the feeding sprocket 17 any film which may be placed within the general area of the gate. It will be evident that a contrary movement will quickly retract such fingers from such locking position so that the film may be removed from the apparatus or a new film inserted.

Under certain conditions, notably for use with an automatic advertising apparatus of the type which shows a film repetitiously, it may be desired to operate the positioning and locking fingers prior to the closing of the gate but to leave them in operative or locking position while the gate is open, thus facilitating and safe guarding the high speed rewinding of a film through the gate. In such case, use may be made of the modified construction shown in Figures 4, 4a, and 4b. Such modified construction also makes use of a simplified form of connection between the movable gate section and the film removing and protecting member. In such modified construction, to the inward side of such film removing and protecting member 40 there may be affixed a plurality of pins 41, such pins being adapted to co-operate with the teeth 42 of the rack 43, such rack being attached to the movable section 44 of the gate. It will be readily understood that as the rack 43 by the movement of the section 44 is moved from the position shown in Figure 4a to that shown in Figure 4b, the film removing and protecting member 40 will be quickly rotated to the inoperative position shown in Figure 4b, such movement being completed before the gate is completely closed, with the desirable results elsewhere set forth. Subsequent movement of the movable section 44 of the gate will have no effect upon the member 40 since two of the pins 41 will slide along the flat surfaces 45 of the rack bar 43, thus holding the member 40 in locked position. The rack bar 43 may be held in proper relation to the stripping and shielding member 40 as by the pin 46.

To operate the positioning fingers 50 attached to the shaft 51 the plate 52 is provided, pinned to the shaft 51. In an elongated arcuate slot 53 of such plate the headed right angled end of the link 54 may operate, such link being suitably attached to the right-angled extension 55 of the stripping and shielding member 40. By reference to Figure 4, it will be apparent that the rotation of the member 40 from the position shown in Figure 4a to that shown in Figure 4b will be effective to move the plate 52 from the position shown in dotted line in Figure 4 to the position shown in full line. Subsequent movement, however, of the member 40 and consequently of the link 54 will be without effect upon the plate 52 and hence the fingers 50 since the headed end of the link 54 will work freely in the arcuate slot 53. To hold the positioning fingers in either operative or inoperative position, a flat piece 56 is attached to the shaft 51, or a flat is formed in the shaft, if of sufficiently large diameter, and the light spring 57, attached as to the main frame F, provided to bear against it. When it is desired to remove a film from the apparatus and substitute another, the positioning fingers may be moved to the position shown in dotted line in Figure 4 by means of the handle 58 (Figure 4a) attached to the shaft 51.

It will be evident that the above construction is particularly adapted for use in a film handling apparatus designed for advertising purposes since in such apparatus the same film is projected and re-wound many times, without attention upon the part of the operator. It is desirable, however, that during re-winding, such re-winding being carried out at a relatively high speed, provision be made to prevent escape of the film from its path through the gate and from one spindle to the other. It will also be evident that the construction above described makes it entirely practical to dispense with the permanent side guiding means often provided in film handling apparatus, thus simplifying the construction and use of the gate and associated parts and saving expense. It will be realized, however, that the primary function of the positioning and locking fingers 50 is quite different from that of the side guiding element conventionally used in film handling apparatus, although such positioning fingers may also be utilized to perform the function of such guiding means.

The forms of our invention shown in Figures 5 to 10, both inclusive, are particularly well adapted to apparatus in which the movement through the gate is provided by a feeding member of the intermittent grip type.

In the preferred modification shown in Figure 5, there may be mounted on the front side of the frame F' a fixed gate section 61 secured in any desired manner against movement relatively to the frame. The movable gate section 62 may be supported as upon the pins 63, movement of such section being accomplished as by the rod 64, which may be operated in any desired manner, as, for instance, in that shown in Figure 1 and described in connection therewith. For supporting the film f, the spindles 65 and 66, rotatable in a fixed position relative to the apparatus, may be provided. For feeding the film through the gate, fingers, as indicated by the member 67, may be provided.

A portion of the fixed gate section 61 may be suitably relieved to accommodate therein the right-angled extension 68 of the stripping and shielding member 69 which is mounted upon the flat plate 70 guided as by the brackets 71 attached to the frame F' and urged to the right as viewed in the drawings by the tension spring 74 one end of which is attached to a right-angled protuberance 75 of the plate 70 and the other end of which is attached to the pin 76. In the slot 77 of the stripping and shielding plate 69 there operates the pin 78 fixed upon the movable gate section 62.

By reason of this construction, it will be evident that as the movable gate section 62 is moved to the right, as shown in the drawings, by means of the rod 64, the spring 74 will be effective to move the stripping and shielding member 69 until the right-angled portion 68 thereof is seated within the recess provided therefor in the fixed gate section 61, such seating obviously being accomplished during the first portion of the movement of the movable gate section 62. Further movement of the gate section 62 will be without effect upon the shield 69 since the pin 78 will move in the slot 77. When the gate is completly closed, the member 69 will cooperate with the fixed gate section 61 to form a portion of the film track. Movement of the movable gate section 62 to the left as viewed in the drawings will be without effect upon the plate 69 until the pin 78 has travelled the length of the slot 77, whereupon it will be effective for moving the stripping and shielding member 69 into operative position thereby removing the film f from the teeth of the member 67 and completely protecting it therefrom.

A suitable light aperture is provided and also suitable openings permitting the operation of the teeth 67.

To operate the positioning fingers 80 attached to the shaft 81 the arm 82 and the links 83 and 84 are provided, as clearly shown in Figure 6, the link 84 preferably being a right-angled extension of the plate 70. It will thus be evident that when the plate 70 is moved to the right as viewed in the drawings in the manner previously described, the rod 81 will be rotated in a clock-wise direction as viewed in Figure 6, and the fingers 80 moved from the position shown in full line in such figure to that shown in dotted line. It will be readily understood that if desired such fingers may be so positioned as to serve also as the conventional guiding element for the film after it has been positioned in the apparatus.

Figures 7 and 8 show a simplified modification of our invention in which a plurality of fingers 91 are attached to the movable section 92 of the gate and pass through openings 85 in the fixed gate section 86. By reason of this construction, it will be evident that when the rod 87 is moved to the right as viewed in Figures 7 and 8, the fingers 91 are moved through the appropriate openings 85 in the fixed gate section 86 and the film f placed into operative position relative to the teeth of the moving member 88 by the movement of the gate section 92 into cooperative relation with gate section 86. Similarly, movement of the movable secton 92 to the left as viewed in the drawings, will be effective to remove the film from the teeth of the member 88. Since we provide a plurality of such stripping elements, it will be evident that such elements protect the film from the teeth of the moving element as well as merely remove it therefrom. In such construction, the film is mounted upon the spindles 89 and 90 which are rotatable in a fixed position in relation to the frame F'' to which the fixed gate section 86 is attached against movement relative thereto.

In Figures 9 and 10 another preferred modification of our invention is shown, such modification being similar to that shown in Figures 5 and 6, but with positive mechanical connection between the members.

The stripping and shielding member 95 is mounted as upon the bar 96 supported as in the brackets 97, of which one is omitted from the drawings for clarity. Attached to the movable section 98 of the gate is the plate 99 terminating in the tooth 100 adjacent the slot 101. Coacting with such slot and tooth is the tooth 102 mounted upon the circular plate 103 which is mounted for rotation upon the pin 104 affixed to the main plate. Attached to such circular plate is the pinion 105, the teeth of which mesh with the teeth 106 cut in the bar 96. By reason of this construction, it will be evident that when the movable gate section 98, by means of the gate control rod 107, is moved toward the fixed gate section 108, the plate 103 will be rotated in a clock-wise direction, thus moving the stripping and protecting member into the recess 109 provided therefor in the fixed section 108, such member being seated therein before the movable section 98 has reached the line D' (Figure 9). When the stripping and shielding member 95 has become seated in its recess, the pin 102 will have escaped from the slot 101 and together with the pin 110 will bear against the flat surface of the bar 99 as the movable section 98 of the gate completes its movement into cooperative relation with the fixed section 108. The movement of the movable section 98 in a contrary direction, to the left as viewed in the figures, will be without effect upon the stripping and shielding member 95 until the tooth 100 engages with the pin 101 and thereby rotates the circular plate 103 in a counter-clockwise direction and thereby actuates the stripping and shielding member.

To operate the positioning and locking fingers 113, attached to the shaft 114, the arm 115, link 116, and arm 117, the latter attached to the bar 96, may be provided whereby movement of the circular plate 103 from the position shown in Figure 9 to that shown in Figure 10 is effective to rotate the shaft 114 and move the positioning and locking fingers to operative position, and to force a film placed within the general area of the gate into the desired lateral position relative thereto and to the feeding element 118, a contrary movement removing such fingers from locking position.

The above construction furnishes a positive mechanical means whereby the stripping and shielding member may be actuated by the movement of the movable gate section and in the desired timed relation to such movement.

It will be evident that our invention may be applied to any type of film handling apparatus, although in this specification it is described as applied to a projector or camera.

It is of course understood by those skilled in the art, that when a film pull down of the finger or intermittent grip type is used, the finger or fingers of such movement generally extend through an opening in a fixed gate section and into the film channel and that the movable gate section, after having been moved into cooperative relation with the fixed section, will press the film into driven relation with the fingers. Such construction is shown in Figures 5 to 9 inclusive. When an intermittently operated sprocket is used, such a sprocket being the equivalent of the finger type of movement, it is generally mounted below the fixed gate section, and a presser member, generally attached to the movable gate section, used to press the film into driven relation with the sprocket. Such forms are shown in Figures 1 to 4b of the drawings. It will be readily understood that a presser member, whether it is a movable gate section of the type shown in Figures 5 to 9 inclusive, or a separate member or shoe attached to and movable concomitantly with the movable gate section of the type shown in the other figures, operates exactly the same in its broader aspects. Consequently, in the subjoined claims, for simplicity and to save multiplying the number of claims, the term "movable gate section" (or member) has been applied in many instances to either a movable section which cooperates with a fixed gate section through which a finger extends, or to a separate shoe which moves with the movable gate section and cooperates with a sprocket. The term "movable gate section", therefore, when applied in connection with a film moving member, may be considered to be either a movable gate section which embodies a presser member, or a presser member movable concomitantly with a movable gate section.

Certain of the advantages of the present invention have been set forth in the preceding portion of this specification.

Other advantages include the provision of a simplified, efficient, and inexpensive film removing and protecting member, positioning and locking member, and mechanism for operating the same. Other advantages include the provision of accelerated operation of such members relative to the closing of the gate and delayed operation relative to the opening of the gate.

Other advantages include the provision of an inexpensive stripping element fixed to the movable gate section and serving to protect the film from the teeth of the moving element as well as to strip it therefrom.

Still other advantages include the provision of a film removing and film protecting member which when the gate is closed cooperates with the fixed gate section to form a portion of the channel through which the film may be operated, such member preferably being operated by the movement of the gate.

We claim:

1. In a film handling apparatus, an openable gate, means for opening said gate, a toothed member for feeding a film through said gate, means for bodily removing the film from the teeth of said feeding member, means carried by said openable gate to operate said removing means from a first position wherein the teeth of said member are accessible by the film to a second position wherein the film is removed and protected from the teeth of said member, said operating means carried by said openable gate including a lost motion device which maintains said removing means in such first position until said gate is opened a predetermined distance whereupon said gate actuates said means carried thereby to move said removing means from said first to said second position whereby the film is removed from the teeth of said member.

2. In a film handling apparatus, a movable gate section, a fixed gate section, means for moving said movable section relatively to said fixed section, a member for feeding a film between said sections, means movable relatively to both of said sections and effective for bodily removing the film from said feeding member, a motion transmitting connection between said movable gate section and said removing means, said connection including a driving element mounted upon said movable section and movable therewith and a driven element operatively attached to said film removing means, said motion transmitting connection operating said film removing means to remove said film when said movable section is moved, and means separate from said motion transmitting connections for moving said movable gate section.

3. In a film handling apparatus, a fixed gate section, a movable gate section, means adapted to move said movable section relatively to said fixed section, a member adapted to feed a film between said sections, means for bodily removing the film from said feeding member, and sequential control means operatively interconnecting said movable section and said removing means and including devices for transmitting one portion of the movement of said movable section to said film removing means for operating said film removing means and for maintaining said film removing means against movement during another portion of the movement of said movable gate section.

4. In a film handling apparatus, a sectional gate, means for moving one of said sections relatively to another, a toothed member for feeding a film between said sections, a movable protective member for cooperation with said toothed member, and sequential means for actuating said protective member from a first position wherein it renders the teeth of said feeding means accessible by the film to a second position wherein it protects the film from such teeth, said actuating means including cooperating driving and driven elements for holding said protective member locked in one of such positions during one portion of the movement of said movable gate section and for transmitting motion to said protective member during another portion of said movement whereby said protective member is moved from one of such positions to the other.

5. In a film handling apparatus, a fixed gate section, a gate section movable relatively thereto, a toothed member for feeding a film between said sections, protective means movable to a position wherein it causes relative movement between the teeth of said member and the film, mechanism connecting said movable section and said protective means whereby one is operated by the other, said mechanism including a driving element and a driven element and devices disposed therebetween for transmitting only a portion of the movement of said driving element to said driven element and means separate from said connecting mechanism for moving said movable gate section.

6. In a film handling apparatus, an openable gate comprising a fixed section and a section movable relatively thereto, a toothed film feeding member cooperating with said gate, means mounted for movement with said movable gate section and effective for moving a film into driven engagement with the teeth of said member, means for bodily removing the film from the teeth of said member, and a connection between said movable gate section and said film removing means necessarily effective, during the initial period of the movement of said film moving means toward said feeding member, for moving said film removing means to a position without the path between said moving means and said member whereby said moving means is free to press the film into driven engagement with said member, or necessarily effective, after said film moving means has been moved a predetermined distance away from said feeding member, for moving said film removing means to a position between said member and said moving means whereby the film is removed from the teeth of said member.

7. In a film handling apparatus, a gate comprising a fixed section and a section movable relatively thereto, a toothed member for feeding a film between said sections, a protective member, said protective member being movable from a first position wherein the film is protected from the teeth of said member to a second position wherein the teeth of said member are accessible to the film and said protective member is completely removed from the area of operation of said teeth and the film, and sequential control mechanism interlocking said movable section and said protective member, said sequential mechanism including means effective for first moving said protective member from such first to such second position and for moving said movable section a predetermined distance only toward said fixed section, means for thereafter drivingly disconnecting said sequential mechanism and said protective member, and means for thereafter moving said movable section into cooperative relation with said fixed section.

8. In a film handling apparatus, an openable gate, a member for feeding a film therethrough, means for bodily removing the film from said feeding member, and sequential interlocked control mechanism for said gate and said means, said sequential control mechanism including means for opening said gate, means for maintaining said film removing means inoperative during a first portion of the opening movement of said gate, means for thereafter drivingly connecting said removing means and said control mechanism, and means for thereafter operating said removing means during the completion of the opening movement of said gate.

9. In a film handling apparatus, an openable gate, a member for feeding a film therethrough, means for protecting the film from said feeding member, and sequential interlocked control mechanism for said gate and said means, said sequential control mechanism including means for opening said gate, means for maintaining said film protecting means inoperative during a first portion of the opening movement of said gate, means for thereafter drivingly connecting said protecting means and said control mechanism, and means for thereafter operating said protecting means during the completion of the opening movement of said gate.

10. In a film handling apparatus, a gate comprising a fixed section and a section movable relatively thereto, a toothed member for feeding a film between said sections, means for bodily removing the film from the teeth of said member, and sequential control mechanism interlocking said movable section and said removing means, said sequential means including means for operating said removing means, means for first moving said movable section a predetermined distance away from said fixed section, and means for thereafter drivingly connecting said removing means and said means for operating said removing means.

11. In a film handling apparatus, a gate comprising a fixed section and a section movable relatively thereto, a toothed member for feeding a film between said sections, protecting means for causing relative movement between the film and the teeth of said member, and sequential control mechanism interlocking said movable section and said protecting means, said sequential mechanism including means for operating said protecting means, means for first moving said movable section a predetermined distance away from said fixed section, and means for thereafter drivingly connecting said protecting means and said means for operating said protecting means.

12. In a film handling apparatus, an openable gate, means for closing said gate, a toothed member for feeding a film through said gate, a movable protecting member, means for moving said protecting member from a first position wherein the film is protected from the teeth of said member to a second position wherein the teeth of said member are accessible to the film, and sequential operating means connecting said gate and said protecting member, said sequential operating means including means for completely moving said protecting member from such first to such second position during the initial period of the closing of said gate whereby the film is rendered accessible to the teeth of said feeding member and including means for maintaining said protecting member in such second position during the succeeding final closing movement of said gate.

13. In a film handling apparatus, a gate comprising a fixed section and a section movable relatively thereto, toothed means for feeding a film therebetween, means for removing the film from the teeth of said feeding means, a mounting for said film removing means, said film removal means being supported by said mounting between said sections of the gate, and sequential operating means interlocking said mounting and said movable section, said sequential operating means including means for moving said movable gate section relatively to said film removing means and to said fixed section, means for maintaining said film removing means inoperative during the first portion of such gate moving operation, and means for thereafter drivingly connecting said film removing means and said operating means during the continued movement of said movable section relatively to said fixed section.

14. In a film handling apparatus, a gate comprising a fixed section and a section movable to a cooperative position relative thereto for defining a path therebetween through which a film may be fed, means for guiding the film into a predetermined position between said sections, said guiding means including a guiding member disposed between the sections of said gate, and sequential operating mechanism interlocking said guiding means and said movable section, said sequential operating mechanism including devices for moving said movable section toward said fixed section, devices for moving said guiding member toward said fixed section and to a position upon the side of such film track opposite that upon which said movable section is disposed, and devices for operatively disconnecting said guiding member and said operating mechanism during the continued movement of said movable section into cooperative relation with said fixed section whereby said film track is defined.

15. In a film handling apparatus, a gate which defines a path through which a film may be fed, said gate comprising a fixed section, a movable section, and an operable auxiliary guiding member disposed therebetween, an operating connection directly connecting said movable section and said guiding member, and means for moving said movable section relatively to said fixed section, upon the movement of said movable section into cooperative relation with said fixed section said guiding member being moved by said operating connection from guiding position into a cooperative relation with said fixed section wherein said fixed section and said guiding member define one side of such path through which the film may be fed and said movable section defines the opposite side of such path.

16. In a film handling apparatus, a gate which defines a path through which a film may be fed, said gate comprising a fixed section, a movable section, and an operable auxiliary guiding member disposed therebetween, sequential operating control means interlocking said movable section and said guiding member, and means for moving said movable section relatively to said fixed section, said sequential control means including means for moving said movable section toward said fixed section, means effective upon the first portion of said movement for moving said guiding member from guiding position into such cooperative relation with said fixed section that said fixed section and said guiding member define one side of such path through which the film may be fed, and means effective upon the succeeding portion of the movement of said movable section toward said fixed section to a position wherein said movable section is disposed in cooperative relation to said fixed section wherein it defines the other side of said feeding path for maintaining said guiding member fixed in said path defining relation to said fixed section.

17. In a film handling apparatus, a gate which defines a path through which a film may be fed, said gate comprising a fixed section, a movable section, and an operable auxiliary guiding member, said sections and said guiding member being disposable in a first position wherein said movable section is positioned in cooperative relation with said fixed section and a film disposed therebetween and said guiding member and said fixed section define one side of the path through which the film may be fed and said other section defines the other side of said path and a second position wherein said sections are positioned in relatively distant relation to each other and said guiding member is placed in a predetermined guiding position between said sections, and sequential control mechanism operatively connecting said auxiliary guiding member and said movable gate section, said sequential control mechanism including means for moving said movable section and said guiding member between said first and second positions and devices which maintain said auxiliary guiding member in path-defining relation with said fixed section during the first portion of the movement of said movable section from said first to said second position.

18. In a film handling apparatus, a gate comprising a plurality of sections, means for moving one of said sections relatively to another, a toothed member for feeding a film therebetween, means for protecting the film from the teeth of said member, said means comprising a plurality of film protecting members one of which is adapted to engage the film upon one side of said feeding member and another of which is adapted to engage the film upon the other side of said feeding member, a support for said film protecting members, said support being movable relatively to said gate sections, and sequential control mechanism operatively connecting said movable section and said support, said sequential control mechanism including devices for holding said support locked during the initial period of movement of said movable section away from said fixed section whereby during such period of movement said protecting members are locked in protective position and for moving said support during the final period of movement of said movable section away from said fixed section, whereby said members are moved to inoperative position.

19. In a film handling apparatus, a gate comprising a plurality of sections, means for moving one of said sections into cooperative relation with another thereof for the purpose of defining a path therebetween through which a film may be fed, toothed means for feeding a film through such path, and means for guiding the film into a predetermined position relative to the teeth of said feeding means, said guiding means comprising a supporting member extending substantially parallel to the direction of travel of the film through such path and disposed adjacent thereto and bodily movable relatively to said movable gate section, a film engaging member extending from said supporting member at substantially a right angle thereto and disposed adjacent such path upon one side thereof, and an actuating member extending from said supporting member in a direction away from such path, and mechanism for operating said actuating member, said mechanism including an operating connection between said movable gate section and said actuating member whereby said guiding means is operated upon the movement of said movable section.

20. In a film handling apparatus, a gate comprising a fixed section and a section movable relatively thereto, toothed means for feeding a film between said sections, means for rendering the teeth of said member inaccessible by the film, and mechanism for operating said means, said mechanism comprising a rotatable element, a connection between said means and said element whereby the rotation of said element causes the latitudinal movement of said means, and a connection between said movable gate section and said rotatable element whereby upon the movement of said movable section relatively to said fixed section said element is rotated.

21. In a film handling apparatus, a gate comprising a fixed section and a section movable relatively thereto, toothed means for feeding a film between said sections, means for rendering the teeth of said member inaccessible by the film, and mechanism for operating said means, said mechanism comprising a rotatable element, a connection between said means and said element whereby the rotation of said element causes the latitudinal movement of said means, and a connection between said movable gate section and said rotatable member, said connection being so constructed and arranged that the first portion of the movement of said movable section toward said fixed section rotates said member and the succeeding portion of such movement holds said rotatable member locked in the position into which it has been so rotated.

22. In a film handling apparatus, a gate comprising a fixed section and a section movable relatively thereto, toothed means for feeding a film between said sections, means for rendering the teeth of said member inaccessible by the film, and mechanism for operating said means, said mechanism comprising a rotatable toothed element, a rack connecting said element and said member whereby the rotation of said element causes the latitudinal movement of said member, and a connection between said movable gate section and said rotatable member whereby the movement of said movable section toward said fixed section rotates said member.

23. In a film handling apparatus, a gate comprising a fixed section and a section movable relatively thereto, toothed means for feeding a film between said sections, means for rendering the teeth of said member inaccessible by the film, and mechanism for operating said means, said mechanism comprising a rotatable toothed element, a rack connecting said element and said member whereby the rotation of said element causes the latitudinal movement of said member, and a connection between said movable gate section and said rotatable member whereby the movement of said movable section toward said fixed section rotates said member, said last mentioned connection comprising a tooth extending from said rotatable element, a bar extending from said movable gate section, and a tooth extending from said bar and adapted to cooperate with the tooth upon said rotatable element.

24. In a film handling apparatus, a gate comprising a fixed section and a section movable relatively thereto, a toothed member for feeding a film between said sections, means for removing the film from the teeth of said member, and mechanism for operating said means, said mechanism comprising a toothed operating element supporting said means and arranged for latitudinal movement, a toothed rotatable member engaging with the teeth of said element, a second operating element attached to said movable gate section for latitudinal movement therewith, and a connection between said second mentioned element and said rotatable member whereby the movement of said second mentioned element by the movement of said section rotates said member and operates said film removing means.

25. In a film handling apparatus, a toothed member for feeding a film and means for removing the film from the teeth of said member, said means comprising a plate which embodies a supporting section, a film engaging section extending therefrom to a position adjacent the film on the same side thereof as that upon which said member is disposed, and an operating section extending from said supporting section at substantially a right angle to said film engaging section and embodying teeth cut therein and adapted to cooperate with toothed operating means whereby movement is imparted to said film engaging section for the purpose of moving it against the film, and toothed operating means for cooperation with said operating section.

26. In a film handling apparatus, a gate comprising a fixed section and a section movable to a cooperative position relatively thereto for defining the sides of a path therebetween through which a film may be fed, a member movable from a position parallel to the plane of said sections to a position at right angles thereto for defining the outer edge of such path, operable means for guiding the film into a predetermined position between said sections, said guiding means including a guiding member disposed between the sections of said gate and so disposed as to cooperate with said first mentioned member upon the movement thereof to such second mentioned position, and operating mechanism interlocking said moving member, said guiding means and said movable section and constructed for first moving said movable section toward said fixed section and said guiding member toward said fixed section and to a position upon the side of such film track opposite that upon which said movable section is disposed and said moving member to cooperative relation with said guiding member and said movable section whereby the outer edge of such path is defined and thereafter moving said movable section into cooperative relation with said fixed section whereby the sides of said film track are defined.

27. In a film handling apparatus, a sectional gate, means for moving one of said sections relatively to another, a toothed member for feeding a film between said sections, a movable protective member for cooperation with said tooth member, means for moving said protective member from a first position wherein said protective member renders the teeth of said feeding member accessible by the film to a second position wherein said protective member protects the film from such teeth, the movement of said protective member from such first to such second position being effective for bodily removing the film from such teeth, said moving means moving said protective member from one of said positions to the other in timed relation to the movement of said movable section relatively to said fixed section, said moving means including a mutilated rack and motion transmitting elements cooperating therewith, the mutilated portion of said rack holding said protective member locked in one of such positions during one portion of the relative movement between said section and said protective member and during another portion of such relative movement motion being transmitted between said rack and said elements whereby said protective member is moved from one of such positions to the other.

28. In a film handling apparatus, a gate comprising a plurality of sections, means for moving one of said sections relatively to another, a toothed member for feeding a film therebetween, means for removing the film from the teeth of said member, said means comprising a plurality of film removing members one of which is adapted to engage the film upon one side of said feeding member and another of which is adapted to engage the film upon the other side of said feeding member, a support for said film removing member, said support being movable relatively to said gate sections, and sequential control mechanism operatively connecting said movable section and said support, said sequential control mechanism including devices for holding said support locked during the initial period of movement of said movable section away from said fixed section whereby during such period of movement said film removing members are maintained inoperative and for moving said support during the final period of such movement of said movable section away from said fixed section whereby said film removing members are operated.

29. In a film handling apparatus, a gate and a support therefor, said gate including a section movable relatively to said support and an auxiliary guiding member cooperating with said gate and bodily movable relatively to said section and to said support, a connection carried by said movable section and operatively attached to said member for moving said member upon the movement of said movable gate section, means for moving said movable gate section, and guiding means upon said support for guiding said connection relatively to said section and said support upon such movement of said gate section.

30. In a film handling apparatus, a movable gate section, a film feeding member cooperating therewith, means for removing the film from said feeding member, rotatable means for laterally positioning a film relatively to said member, and operating mechanism directly interconnecting said movable gate section, said removing means, and said positioning means for operating both of said means by the movement of said section.

31. In a film handling apparatus, an openable gate, means for laterally moving a film into said gate, and connective operating mechanism directly interconnecting said gate and said moving means.

32. In a film handling apparatus, a fixed gate section, a movable gate section, means to move said movable section relatively to said fixed section, means for laterally moving the film into position between said sections, and connection between said movable section and said laterally moving means for operating said laterally moving means by the movement of said movable section.

33. In a film handling apparatus, a fixed gate section, a movable gate section, means for moving said movable section into cooperative relation to said fixed section, means for laterally positioning the film between said sections, and mechanism directly connecting said movable section and said film positioning means for operating said film positioning means by the initial movement of said movable section before said movable section has been moved into such cooperative relation to said fixed section.

34. In a film handling apparatus, a fixed gate section, a movable gate section, means for moving said movable section into cooperative relation to said fixed section, a member for feeding the film between said sections, means for laterally positioning the film relatively to said feeding member, and connection between said movable gate section and said film positioning means for operating said film positioning means by the initial movement of said movable section before said movable gate section has been moved into such cooperative relation to said fixed gate section.

35. In a film handling apparatus, a movable gate section, operable means for laterally moving the film into a predetermined position relative thereto, and connective mechanism between said gate section and said film positioning means for operating one thereof by the operation of the other thereof.

36. In a film handling apparatus, an openable gate, means for closing said gate, a member for feeding a film through said gate, means for protecting the film from said member, means for laterally positioning the film relatively to said member, and operating mechanism directly connecting said gate and said protecting means and said positioning means for moving said protecting means to inoperative position and actuating said positioning means by the closing of said gate.

37. In a film handling apparatus, a fixed gate section, a movable gate section, means for moving said movable section into cooperative relation with said fixed section, a member for feeding a film between said sections, means for protecting the film from said member, means for laterally positioning the film between said sections, and operating mechanism directly connecting said movable section and said protecting means and said positioning means for moving said protecting means to inoperative position and said positioning means to operative position by the initial portion of the movement of said movable section before said movable section has been moved into cooperative relation with said fixed section.

38. In a film handling apparatus, a feeding member, means for bodily moving a film into correct lateral relation to said member, means for bodily removing the film from said member, and connective mechanism between said means for operating one thereof by the operation of the other thereof.

39. In a film handling apparatus, a toothed feeding member, means for laterally moving a film into a predetermined position relative to said member, means for protecting the film from said member, and connective mechanism between said means for moving one of said means to inoperative position by the movement of the other thereof to operative position.

40. In a film handling apparatus, an openable gate, means to feed a film through said gate, means movable to a position relative to said gate for locking the film within said gate against lateral movement relative thereto, manual means for moving said locking means from or to such locking position, and a connection between said locking means said manual means and said gate, the closing of said gate actuating said connection to move said locking means to such locking position and said manual means may be employed to move said locking means from such locking position.

41. In a film handling apparatus, a sectional gate, means for moving one of the sections thereof from a relatively distant position to a position wherein it is disposed in an adjacent and parallel relation to another of said sections, a movable member movable to a position adjacent one edge of said sections for locking the film against movement lateral to said sections, an operating connection interlocking said movable member and said movable gate section and constructed to move said movable member to such locking position upon the movement of said movable section toward said fixed section and means effective to maintain said movable member in such locking position upon the subsequent movement of said movable section away from said fixed section.

42. In a film handling apparatus, a sectional gate through which a film may be fed, means for moving one of said sections relatively to another, a member movable to a position wherein it locks the film between said sections against movement lateral thereto, an operating connection between said movable gate section and said member constructed to move said member to such locking position upon movement of said movable section toward said other section, and a handle for moving said member from such locking position without affecting said movable section.

43. In a film handling apparatus, a member for feeding a film, a presser member for bringing the film into driven relation with said feeding member, means for moving said presser member into cooperative relation to said feeding member, means for laterally moving the film into a predetermined position between said members, and operating mechanism connecting said presser member and said lateral moving means, the movement of said presser member toward said feeding member actuating said operating mechanism to render said positioning means operative.

44. In a film handling apparatus, a feeding member, a presser member movable into cooperative position relative to said feeding member for bringing the film into driven relation therewith, means for moving said presser member into such position, means for laterally positioning the film between said members, and mechanism connecting said presser member and said positioning means, the initial portion of the movement of said presser member toward said feeding member actuating said mechanism to render said positioning means operative.

45. In a film handling apparatus, means for defining a path of travel for a film in such apparatus, means for feeding the film through such path, said defining means including a first fixed member, disposed adjacent such path and defining one side of such path, a second fixed member disposed at right angles to said first fixed member and defining another side of such path, a third member movable into cooperative and parallel relation to said first fixed member and said feeding means, and arranged, when in such relation, for defining the side of such path opposite that defined by said first member and for holding the film in driven relation with said feeding means, and a fourth member movable to a position parallel to said second member and at right angles to said first and third members and arranged, when in such position, for defining the remaining side of such path, and an operating connection directly connecting said third and fourth members for operating one thereof by the movement of the other.

46. In a film handling apparatus, means for defining a path of travel through which a film may be fed, said defining means including a first fixed member defining one side of such path, a second fixed member disposed at right angles to said first fixed member and defining another side of such path, a third member movable into cooperative and parallel relation to said first fixed member and arranged, when in such relation, for defining the side of such path opposite that defined by said first member, and a fourth member movable to a position parallel to said second member and at right angles to said first and third members and arranged, when in such position, for defining the remaining side of such path, and an operating connection directly connecting said third and fourth members for operating one thereof by the movement of the other.

47. In a film handling apparatus, means for defining a path of travel through which a film may be fed, said defining means including a first fixed member defining one side of such path, a second fixed member disposed at right angles to said first fixed member and defining another side of such path, a third member movable into cooperative and parallel relation to said first fixed member and arranged, when in such relation, for defining the side of such path opposite that defined by said first member, and a fourth member movable to a position parallel to said second member and at right angles to said first and third members and arranged, when in such position, for defining the remaining side of such path, and an operating connection directly connecting said third and fourth members, the movement of said third member to cooperative relation with said first member actuating said operating connection to move said fourth member into such above recited position wherein it defines such remaining side of such path and the movement of said third member from such cooperative relation with said first member being without effect upon said fourth member.

48. In a film handling apparatus, means for defining a path of travel through which a film may be fed, said defining means including a first fixed member defining one side of such path, a second fixed member disposed at right angles to said first fixed member and defining another side of such path, a third member movable into cooperative and parallel relation to said first fixed member and arranged, when in such relation, for defining the side of such path opposite that defined by said first member, and a fourth member movable to a position parallel to said second member and at right angles to said first and third members and arranged, when in such position, for defining the remaining side of such path, and an operating connection between said third and fourth members for operating one thereof upon the movement of the other, and alternative means for operating one independently of the other.

WARREN DUNHAM FOSTER.
FREDERICK DAVENPORT SWEET.